United States Patent [19]

Takeuchi

[11] Patent Number: 4,915,495
[45] Date of Patent: * Apr. 10, 1990

[54] SPECIAL LENS FOR EYEGLASSES

[76] Inventor: Kunio Takeuchi, 1-1, Nishi 23-chome, Hokkaido 064, Japan

[*] Notice: The portion of the term of this patent subsequent to Apr. 4, 2006 has been disclaimed.

[21] Appl. No.: 215,259

[22] Filed: Jul. 5, 1988

Related U.S. Application Data

[63] Continuation of Ser. No. 33,913, Apr. 1, 1987, which is a continuation of Ser. No. 776,142, Sep. 4, 1985.

[30] Foreign Application Priority Data

Jan. 4, 1984 [JP] Japan .................................. 59-000148
Feb. 6, 1984 [JP] Japan .................................. 59-20530

[51] Int. Cl.$^4$ .............................................. G02C 7/12
[52] U.S. Cl. ....................................... 351/49; 351/163
[58] Field of Search ................. 351/49, 163, 164, 165, 351/166

[56] References Cited

U.S. PATENT DOCUMENTS 3,211,047 10/1965 Heimberger .......................... 351/49
4,261,656 4/1981 Wu ....................................... 351/163
4,818,095 4/1989 Takeuchi ............................. 351/159

FOREIGN PATENT DOCUMENTS 30-17975 12/1955 Japan .
49-37545 10/1974 Japan .
51-5304 2/1976 Japan .
53-29711 8/1978 Japan .

Primary Examiner—P. M. Dzierzynski
Attorney, Agent, or Firm—Fred Philpitt

[57] ABSTRACT

The present invention provides a method of producing a special lens by bonding a polarizing film to an eyeglass lens on the basis of the angle corresponding to the distortion of eyeball, that is, the distorted vision angle measured.

5 Claims, 1 Drawing Sheet ial Lens for Eyeglasses

SPECIAL LENS FOR EYEGLASSES

This is a continuation of application Ser. No. 33,913, filed Apr. 1, 1987 which is a continuation of application Ser. No. 776,142 filed 9-4-1985 and the benefits of 35 USC 120 are claimed relative to it.

FIELD OF THE INVENTION

The present invention relates to a conception of using a special lens for eyeglasses to protect the operator of a computer from suffering from eyestrain and amblyopia (a serious case, as a result of accumulated physical and mental stress, complains of dizziness, headache, and nausea) caused by long continuous computer operation. No concrete product based on this conception has been seen in Sapporo-Shi, Hokkaido, Japan as of Feb. 4, 1984.

This problem was reported in the description in the Asahi Evening Paper 4th edition (page 7) of Dec. 23, 1983, entitled "So called OA occupational disease is increasingly spreading—causing a distinguished difference in eyestrain and physical stress from general clerical works." The paper told the actual state of the OA disease in detail, wherein the paper provided a measure for the disease simply describing that taking even a short rest brings about considerable effect for recovery from fatigue. However, no further suggestion or comment was made about physical methods or about using more effective eyeglasses. Therefore, the present invention relates to a special lens for eyeglasses based on the novel conception for protecting those involved from eyestrain and amblyopia.

BACKGROUND OF THE INVENTION

The concept of the present invention results from the discovery of the fact that a computer operator wearing hard contact lenses and working continuously on computer operation suffers from less eyestrain as compared with general computer operators wearing no hard contact lenses and also from the investigation of the reason for the fact.

Each individual has a different eyeball strength in his naked eye and has an optical deflection, that is, an astigmatism. It is usual that the left eye is different in astigmatism angle from the right eye. It has become general that astigmatism corrective lenses be used to cure heavily distorted vision.

According to the present invention, a special lens for eyeglasses is produced by measuring the astigmatic angles of the naked left and right eyes of the operator and by bonding polarizing films made on the basis of the calculated degree of distorted vision to both left and right eyeglasses, thus providing eyeglasses for the operator working on computer operation, etc.

BRIEF SUMMARY OF THE INVENTION

The operator of a computer or the like may be assigned long repetitive keyboard typing work while watching characters, drawings, and the like on a display screen. When optical waves converted from electronic signals representing the characters, drawings, and the like enter the operator's naked eyes and concentrate in yellow spot sections of the eyeballs, the operator is required to use the optic nerves to the utmost limit in the process of reading and understanding the display.

In addition to the above, electronic wave motion which repeats instantaneous strong and weak fluctuations makes the brightness of electronic display uneven. The continued vibration of the display makes the display unstable, and further infrared and ultraviolet rays generated from the display screen enter the eyeballs of the operator.

These are combined to cause eyestrain, visual power weakening, and physical strength declining.

An object of the present invention is to make the incident rays to eyeballs constant and to cut harmful incident rays away from eyeballs.

In addition, applying a coating to the lens surface makes it possible to cut out infrared and ultraviolet rays generated on a display screen from entering eyeballs.

PREFERRED EMBODIMENTS OF THE PRESENT INVENTION

1. To describe the present invention in more detail the following embodiments are provided and described in accordance with the attached drawings.

Figure 1:
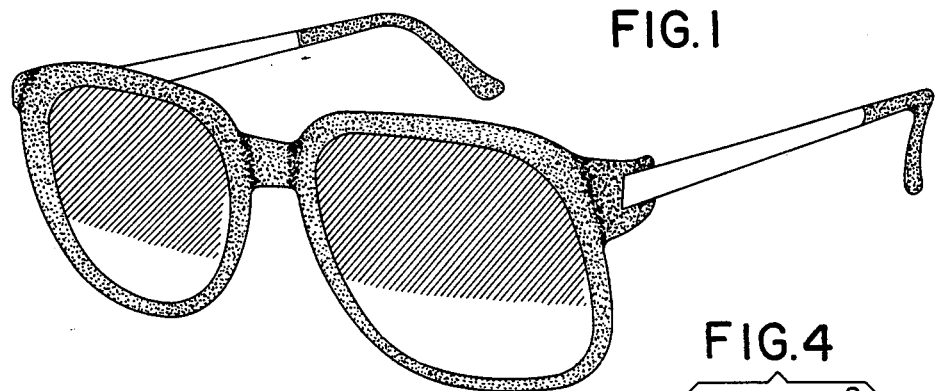
FIG. 1 is a perspective view of eyeglasses using special lenses of the present invention.

FIG. 1 is a perspective view of the eyeglasses using special lenses produced in the process of the present invention.

Figure 2:
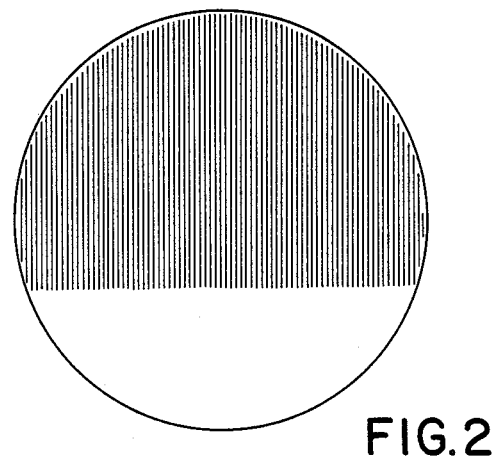
FIG. 2 is a special lens assuming a distorted vision angle to be 180°.

FIG. 2 is a special lens assuming a distorted vision angle to be 180°.

Figure 3:
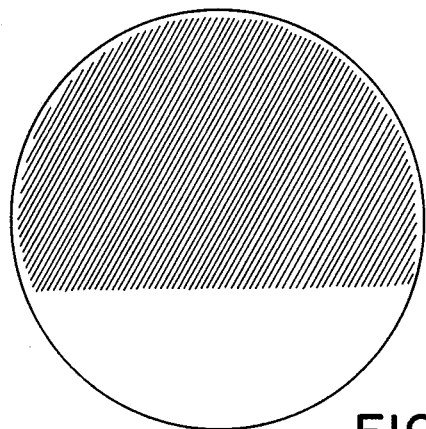
FIG. 3 is a special lens assuming a distorted vision angle to be 150°.

FIG. 3 is a special lens assuming a distorted vision angle to be 150°.

2. Special lenses of the present invention are produced in the following process.

(1) The angles at which the polarizing films are bonded to lenses for eyeglasses are listed below.

Distorted vision angle=$\alpha$ Specially fixed angle=$\beta$

| Case of (angle 0–90°) | Case of angle (90°–180°) |
| --- | --- |
| $\alpha + 90° = \beta$ | $\alpha - 90° = \beta$ |
| Ex. $\alpha = 30°$ | Ex. $\alpha = 100°$ |
| $\alpha + 90° = \beta = 120°$ | $\alpha - 90° = \beta = 10°$ |

(2) In this connection the use of lenses produced considering the following Lens degrees by age group enables eyestrain to be reduced more.

| | |
| --- | --- |
| (15–25 years old) + 0.50 | (35–45 years old) + 1.00 |
| (25–35 years old) + 0.75 | (45–55 years old) + 1.25 |

(3) The polarizing film of the present invention may be a conventional one.

(4) Bonding methods

Figure 5:
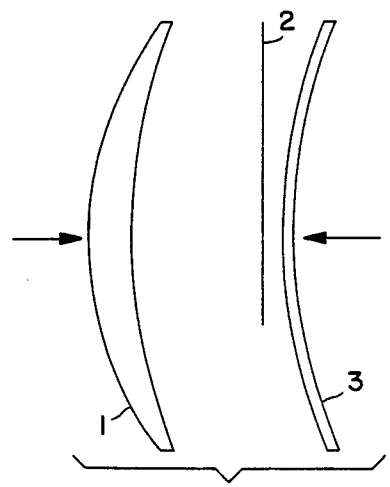
FIG. 5 discloses preferred bonding method 1 described in the following section.

① As shown in FIG. 5, interpose the polarizing film 2 between eyeglass lenses 1 and 3 having the degree of visual power suitable for the operator and bond those together to be finished into one multilayered lens with a particular degree of distorted vision. In this connection, it is preferred to apply compression heating to the lenses and polarizing film.

Figure 4:
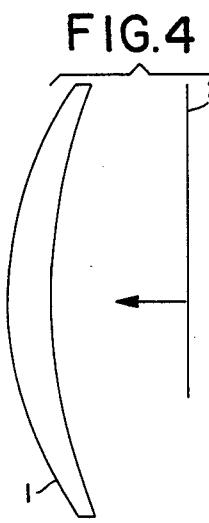
FIG. 4 discloses preferred bonding method 2 described in the following section.

(2) As shown in FIG. 4, firmly bond the polarizing film 2 onto one lens 1 having a lens degree suitable for the operator's visual power and finish into the lens with a particular degree of distorted vision. Its bonding method is similar to method (1) above.

(5) Methods of producing special lenses

To make the bonding of the polarizing film to the lens easy, bond the polarizing film onto two thirds of the entire surface of one side of the lens as shown in FIGS. 4 and 5.

(6) Apply coating to the surfaces of the finished lens to shut out ultraviolet, infrared, and other harmful rays.

INDUSTRIAL APPLICABILITY

Penetration of computer applications in the domestic market in Japan is remarkable, and it is reported that the number of computers manufactured and distributed in the domestic market up to 1983 has reached one million.

Nowadays, computer applications are growing in major enterprises and governmental agencies as well and in units of work sections. The penetration is spreading also to smaller enterprises and to general individual enterprises free lance business men, and further to families.

In spite of the accelerative penetration of computer applicants mentioned so far, no prior art or method for solving the problems of eyestrain, visual power weakening, and physical strength lowering has been developed.

As the news report told in the aforementioned Asahi News Paper's 4th evening issue (Page 7) of Dec. 23, 1983, there are few scientific investigations about how these display apparatuses (VDT) affect workers. A notable report was made by researcher Mr. Hiromoto Shindo of the Labor Science Institute, according to which as a result of investigation for 184 teenaged clerical workers, the number of women workers complaining of mentally bad feeling when getting up in the morning or of tired feeling over the whole body, and the like counts to 55.1% for general clerical workers and counts to as much as 61.5% for VDT clerical workers, while those complaining of unease or frustration counts to 29.5% for general clerical workers and 54.8% for VDT clerical workers. Further, general clerical workers complaining of no interest in work or losing patience with work counts to 30.5% and 39.5% for VDT clerical workers. Besides, in Europe and the U.S.A., reports were made that a rash appears in some VDT workers (Britain and Norway) or that some pregnant woman workers aborted (Canada).

The present invention is the only effective, significant, and concrete method of solving the problem.

Although it is said that the computer is the advent of the third industrial revolution and that its use in growing in advanced countries being headed by the U.S.A., followed by Japan and the EC nations, it is surprising that no method of solving eyestrain, visual power weakening, and physical power lowering has been reported or introduced.

EFFECT OF THE INVENTION

Sixty minutes is said to be the physically endurable maximum time for a computer operator having normal visual power to continue a computer operation work while watching a display screen without wearing any protective device on his eyes.

On the contrary, if the computer operator having the same normal visual power wears the eyeglasses which used the special lenses produced according to the present invention and continues the same work, his endurable time against eyestrain is proved to have the effect of extending to 2 hours and 40 minutes.

The reason for making these improvements possible is because the range of rays passing through the lenses is made constant and correction of distorted vision is made possible, whereby grasping an image concentrating on the yellow spot section of the naked eyes need not have an excess concentration of optic nerves and the contracting action of the lenticular from the normal condition is not necessary.

What is claimed is:

1. A method of preparing a special lens for eyeglasses for an eyeglass wearer, comprising determining an astigmatic distorted vision angle of the eyeglass wearer, and bonding a polarizing film between two eyeglass lenses at an angle determined by the distorted vision angle of the eyeglass wearer, the determined angle being equal to the distorted vision angle plus 90° if the distorted vision angle is from 0° to 90° and the determined angle being equal to the distorted vision angle less 90° if the distorted vision angle is from 90° to 180°.

2. A method of preparing a special lens for eyeglasses for an eyeglass wearer, comprising determining an astigmatic distorted vision angle of the eyeglass wearer, and bonding a polarized film to a surface of an eyeglass lens at an angle determined by the distorted vision angle of the eyeglass wearer, the determined angle being equal to the distorted vision angle plus 90° if the distorted vision angle is from 0° to 90° and the determined angle being equal to the distorted vision angle less 90° if the distorted vision angle is from 90° to 180°.

3. A special lens for eyeglasses for a particular eyeglass wearer having an astigmatic distorted vision angle, said special lens being prepared by determining an astigmatic distorted vision angle of that particular eyeglass wearer, and bonding a polarizing film to a surface of an eyeglass lens at an angle determined by the distorted vision angle of that particular eyeglass wearer, the determined angle being equal to the distorted vision angle plus 90 degrees if the distorted vision angle is from 0 degrees to 90 degrees and the determined angle being equal to the distorted vision angle less 90 degrees if the distorted vision angle is from 90 degrees to 180 degrees.

4. Special lens for eyeglasses as defined by claim 3 wherein a coating is applied to at least one surface of the special lens, which coating shuts out ultraviolet and infrared rays.

5. Special lens for eyeglasses as defined by claim 3 wherein the polarizing film is bonded onto two thirds of the surface of the eyeglass lens and the remaining one third of the eyeglass lens surface is free from polarizing film.

* * * * *